United States Patent Office 3,071,688
Patented Jan. 1, 1963

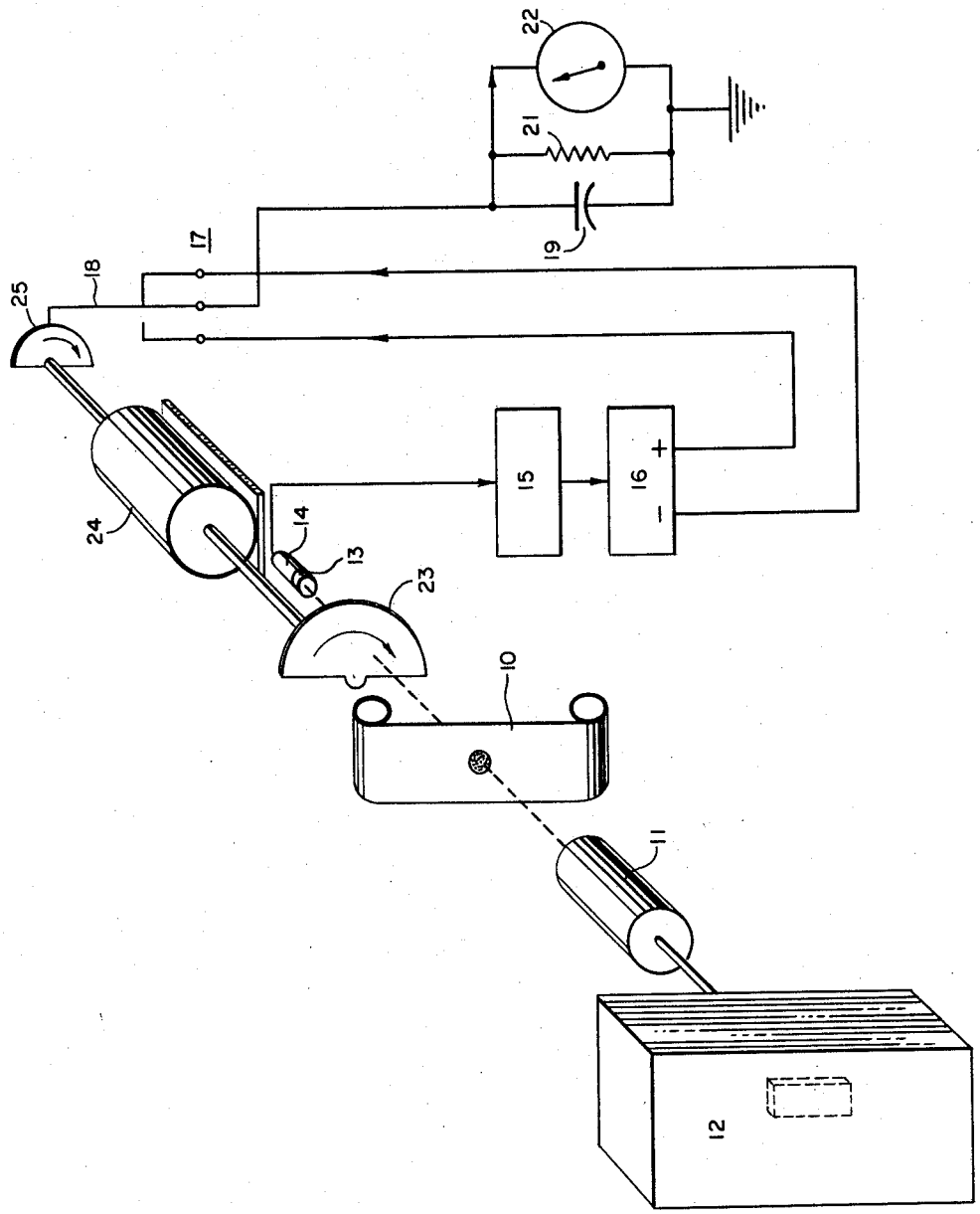

3,071,688
SELECTIVE SIGNAL DETECTOR
Ramond C. Waddel, Washington, D.C., assignor to the United States of America as represented by the Secretary of the Navy
Filed Apr. 30, 1959, Ser. No. 810,195
2 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention relates to detecting and measuring a desired type of signal and more particularly to a system for detecting and measuring a desired type of signal within a field of more intense signals of a different type.

Heretofore, in the field of radioactive measurements a common method of minimizing an undesired background radiation so that a desired radiation of less intensity can be detected and measured is to properly dispose shields of absorbing materials which, by their location and composition, attenuate the undesired radiation more than the desired. Such absorbers are frequently heavy, bulky, and costly. Another well known method of minimizing undesired background radiation is to choose a radiation detector whose sensitivity to the desired radiation is greater, relatively, than to the undesired radiation. This type of device in many cases lead to a detector having other characteristics which are undesirable. Another well known method is to dispose one radiation detector so that it responds to the undesired radiation only and another detector is positioned such that it receives both the desired and undesired radiations. The detectors are permanently connected to a subtracting device which calculates the combined radiations less the undesired radiation to give the amount of the desired radiation. This method depends critically upon maintaining stable, constant detector sensitivities in the two detectors which are effected by ageing, shock and vibration, changes in temperature, humidity, and electrical power, and changes in the direction from which the undesired radiation arrives. Thus, having two detectors involves added cost, space, weight and is subject to failure with consequent erroneous results.

The present invention overcomes the above shortcomings and provides a detector system wherein desired radiation can be detected and measured among more intense radiation. This is done by exposing a radiation detector to a composite of undesired and desired radiations and so altering the combined radiation path to absorb periodically the radiation desired to be detected. Electrical pulses produced by the incident radiations are amplified and fed into a pulse generator. The pulse generator makes available at its output terminals a standard quantity of electric charge of both positive and negative nature each time the device is triggered. The polarity of the pulses taken from the pulse generator is determined by a switch which is synchronized with a device which modulates the desired radiation incident on the detector. The pulses are delivered to a capacitor which, because of a difference in the signals, stores a net charge that is discharged through a resistor to a display device which indicates the amount of the desired radiation.

It is therefore an object of the present invention to provide a device for detecting the presence of a desired radiation in a field of more intense radiation of a different type.

Another object is to provide a system of simple construction, relatively light in weight, and relatively inexpensive.

Yet another object is to provide a device which incorporates only one detector to determine the presence of desired radiation in a field of more intense radiation of another type.

Other objects and advantages of the invention will hereinafter become more fully apparent from the following description and drawing which illustrates a preferred embodiment, and wherein the FIGURE illustrates a presentation of the system employed in the present invention wherein the relative parts are shown in spaced relationship for clarity.

Referring now to the drawing there is shown in the FIGURE a system in accordance with the present invention suitable for detecting and measuring the presence of small amounts of radiation of one type in a more intense field of radiation of another type. As shown a pump 11 pumps air from a volume 12 such as a reactor room or any space which may contain air-borne radioactivity through a filter 10 positioned in the path of the air between the pump and a suitable radiation detector that produces a current due to excitation by the incident radiation. Filter 10 may be stationary, or a slowly moving filter well known in the prior art such as shown and described in an article entitled "Monitor Measures Air and Surface Contamination," by Watts et al., appearing in Nucleonics, vol. 13, #1, January 1955. Suitable detectors are semi-conductors, crystals of various types, scintillators, ionization chambers, geiger tubes, etc.

For the purposes of illustration, the detection means shown in the present invention comprises a scintillating crystal 13 closely coupled optically to a photomultiplier tube 14. The output signal of the photomultiplier tube is supplied to an amplifier 15 of any suitable type which amplifies the signal and directs the signal into a pulse generator 16. The pulse generator 16 makes available at its output terminals a standard quantity of electric charge of both positive and negative nature each time the device is triggered by a signal from the amplifier. The positive and negative pulses from the pulse generator are directed to a double throw switch 17 with the pulses of opposite polarity going to different contacts. The signal is directed from the contacts through the switch arm 18 to the plate of a condenser 19 which stores the charge. Resistor 21 provides a discharge path for the condenser 19 and after a number of cycles of operation the charge in the capacitor and the subsequent voltage across the capacitor is displayed by a suitable meter 22 which indicates the amount of the radiation being determined. The radiation incident on the detector is modulated by a suitable absorption material 23 capable of blocking the radiation being detected and yet suitable for passing the background radiation within which the radiation to be detected is found. The absorber is shown in a semi-circular arrangement such that the material is within the radiation path one-half of the time. The absorption material is driven by a motor 24 which also drives a cam 25 made of an insulating material in synchronism with the absorber. The cam is positioned such that it operates the double throw switch to feed the oppositely charged pulses from the pulse generator to the capacitor depending on the position of the absorber.

For illustrative purposes, the device, as shown, can be used for continuously detecting and measuring a desired type of radiation such as beta particles which may be found as a contaminant in the air supply surrounding an atomic reactor because of a leak in some part of the reactor. Under such conditions beta particles will be found in a background field of gamma radiation. In operation of the device for such radiation detection, suitable current is supplied to the amplifier, the pulse generator and the photomultiplier in the system and to other electrical components such that the electrical devices will be in operation. The pump forces air from the reactor room through the porous filter which collects particles in the air which may be contaminated by beta and gamma particles such as shown in the prior art article previously mentioned. During the period that the modulating absorption material is not in the radiation path, the detector will be viewing both the beta particles and background gamma rays. These radiations incident on the detector will produce pulses in proportion to the amount of both beta and gamma rays. Under these conditions it is assumed that the switch directs the positive pulses to the capacitor and are stored thereby. As the modulator rotates, the absorption material will be brought into the path of the radiation wherein the absorption material blocks the beta rays but permits any gamma rays to pass through. Thus the gamma rays incident on the detector will produce signals in proportion to the incident gamma radiation which are amplified and the pulse generator will now supply pulses to the capacitor in accordance with the radiation incident on the detector. During the time the absorption material is in the path of the radiation the cam 25 actuates the double throw switch such that negative pulses are directed to the capacitor plates. The net charge on the capacitor now will be the difference between the number of positive and negative pulses applied thereto. The negative charge produced by the detector during the time that the absorber material is in the radiation path will equal the positive charge produced by the gamma rays which are in the composite radiation. Thus the net charge on the capacitor due to the gamma radiation will be zero. The positive charge remaining on the capacitor will be equal to the charges due to the beta radiation incident on the detector. Thus the value shown on the indicator will indicate the amount of beta particles in the composite radiation incident on the detector, while the gamma radiation is ignored.

In carrying forth the teaching of the present invention it would be obvious to others that the signals may be of other radioactive types such as alpha particles, neutrons, etc. Further, the invention is not limited to the use of radioactive particles and can be applied to detecting light pulses in a more intense field of electrical interferences of some type.

The modulating method need not be restricted to the rotating absorber described above. It may take the form of moving the detector toward and away from the desired radiation source. The mechanism would operate the switch 17 in synchronism with the detector motion. In an alternative form for preventing one type of radiation from being incident on the photodetector an electric or magnetic field may be applied to periodically deflect the desired particles away from the sensing device.

In carrying out the teachings of the invention for detection of different types of radiation, suitable indicators for indicating the presence of the radiation to be detected will depend on the type of radiation being detected or the end result desired. Such suitable indicating devices are voltmeters, a system of lights, a sound device, or a recording device which will record the information for future observation by other means.

The present invention can also be adapted to detect a desired type of radiation signals in a field of radiation of less intense signals. The desired type of radiation being taken to mean that radiation in the radiation field which is desired to be measured. The undesired radiation can be in a common path with the desired radiation and the detector positioned in the common path to receive the radiation or the detector can be positioned in a radiation field in the presence of incident undesired radiation with the desired radiation directed onto the detector in a path.

Obviously many modifications and variations of the present invention are possible in the light of the above teachings. It is therefore to be understood that within the scope of the appended claims the invention may be practiced otherwise than as specifically described.

What is claimed is:

1. In a system for detecting radiation contaminants in a reactor facility compartment which comprises a pump for pumping an air supply which may include gamma and beta radiation particles from said reactor compartment, a detector adapted to receive incident radiation in said air supply, means for collecting said gamma and beta particles in said air supply in the vicinity of said detector, said detector adapted to produce an output of corresponding electrical pulse variations in response to variations in incident radiation, a single absorber element adapted to modulate periodically said incident radiation to absorb said beta radiation contaminant and to pass other radiation on to said detector, means for alternately changing the polarity of said electrical pulses in synchronism with said modulating means and means for indicating any difference in said output pulses wherein said difference indicates the presence and amount of beta contaminant in said air supply while substantially ignoring other radiations.

2. In a system for detecting beta radiation contaminants in a more intense field of gamma radiation in a reactor facility compartment which comprises a pump for pumping an air supply which may include said gamma and beta radiation contaminant from said reactor compartment, a radiation sensitive detector adapted to receive incident radiation, means positioned in the vicinity of said detector for collecting said gamma and beta particles from said air supply, said detector adapted to produce an output of corresponding electrical pulse variations in response to variations in incident radiation, a semi-circular disc absorber element adapted to modulate said incident radiation by absorbing beta particles from said incident radiation, means for amplyfying electrical pulses produced by said detector due to incident radiation, means for alternately changing the polarity of said electrical pulses in synchronism with said disc absorber modulating means, switch means operative in synchronism with said modulating means to direct alternately pulses of different polarity to a capacitor, and means connected with said capacitor for indicating a net charge on said capacitor, said net charge indicating the presence and amount of beta contaminants in said reactor compartment.

References Cited in the file of this patent
UNITED STATES PATENTS

| | | |
|---|---|---|
| 2,798,198 | Dauphinee | July 2, 1957 |
| 2,806,147 | Stellmacher et al. | Sept. 10, 1957 |
| 2,917,632 | Anton | Dec. 15, 1959 |
| 2,950,393 | Southward | Aug. 23, 1960 |

OTHER REFERENCES

Monitor Measures Air and Surface Contamination, by Watts et al., Nucleonics, vol. 13, No. 1, January 1955, pages 51 and 52.

A.E.C. Research and Development Report DP–188, A Continuous Monitor for Airborne Plutonium, by Collins, November 1956.